(12) United States Patent
Yirmibesoglu et al.

(10) Patent No.: US 11,498,277 B2
(45) Date of Patent: Nov. 15, 2022

(54) EXTRUSION SYSTEM FOR 3-D PRINTING OF VISCOUS ELASTOMERS

(71) Applicant: Oregon State University, Corvallis, OR (US)

(72) Inventors: Osman Dogan Yirmibesoglu, Corvallis, OR (US); Yiğit Mengüç, Corvallis, OR (US)

(73) Assignee: Oregon State University, Corvallis, OR (US)

( * ) Notice: Subject to any disclaimer, the term of this patent is extended or adjusted under 35 U.S.C. 154(b) by 210 days.

(21) Appl. No.: 16/809,245

(22) Filed: Mar. 4, 2020

(65) Prior Publication Data
US 2020/0298492 A1 Sep. 24, 2020

Related U.S. Application Data

(60) Provisional application No. 62/821,572, filed on Mar. 21, 2019.

(51) Int. Cl.
*B29C 64/209* (2017.01)
*B29C 64/336* (2017.01)
(Continued)

(52) U.S. Cl.
CPC .......... *B29C 64/336* (2017.08); *B01F 27/073* (2022.01); *B01F 27/113* (2022.01);
(Continued)

(58) Field of Classification Search
CPC ... B29C 64/118; B29C 64/124; B29C 64/321; B29C 64/209; B29C 64/295;
(Continued)

(56) References Cited

U.S. PATENT DOCUMENTS 10,611,182 B2 * 4/2020 Weiss ..................... B41M 7/009
2005/0015175 A1 * 1/2005 Huang ................... B33Y 50/02
700/121
(Continued)

FOREIGN PATENT DOCUMENTS

GB          2524454          2/2016

OTHER PUBLICATIONS

Yirmibesoglu et al., "Direct 3D Printing of Silicone Elastomer Soft Robots and Their Performance Comparison with Molded Counterparts", 2018 IEEE International Conference on Soft Robotics (RoboSoft) Livorno, Italy, Apr. 24-28, 2018. 8 pages.

*Primary Examiner* — Nahida Sultana
*Assistant Examiner* — Margaret B Hayes
(74) *Attorney, Agent, or Firm* — Mughal IP P.C.

(57) ABSTRACT

Disclosed is direct ink write (DIW) print extrusion head for 3D printing of viscous elastomers. The disclosed print extrusion head comprises a mixer assembly, comprising a fluid distribution cap coupled to a carrier, an in-line mixer coupled to the fluid distribution cap. A cooling jacket surrounds the in-line mixer. A nozzle is coupled to the in-line mixer and protrudes below the cooling jacket over a work surface. The position of the nozzle relative to the work surface is changeable. At least one heat source is on the chassis and disposed adjacent to the fluid distribution cap. The at least one heat source comprises a heat guiding element to direct heat to a region onto the work surface below the nozzle.

14 Claims, 8 Drawing Sheets

(51) Int. Cl.
- B33Y 30/00 (2015.01)
- B33Y 10/00 (2015.01)
- B29C 64/227 (2017.01)
- B29C 64/106 (2017.01)
- B29C 64/25 (2017.01)
- B29C 64/295 (2017.01)
- C08L 83/04 (2006.01)
- B01F 27/07 (2022.01)
- B01F 27/91 (2022.01)
- B01F 27/113 (2022.01)
- B01F 27/2124 (2022.01)
- B01F 35/92 (2022.01)
- B29K 83/00 (2006.01)
- B33Y 70/00 (2020.01)
- B01F 35/90 (2022.01)
- B01F 101/00 (2022.01)

(52) U.S. Cl.
CPC .......... *B01F 27/2124* (2022.01); *B01F 27/91* (2022.01); *B01F 35/92* (2022.01); *B29C 64/106* (2017.08); *B29C 64/209* (2017.08); *B29C 64/227* (2017.08); *B29C 64/25* (2017.08); *B29C 64/295* (2017.08); *B33Y 10/00* (2014.12); *B33Y 30/00* (2014.12); *C08L 83/04* (2013.01); *B01F 2035/98* (2022.01); *B01F 2101/2805* (2022.01); *B29K 2083/00* (2013.01); *B33Y 70/00* (2014.12)

(58) Field of Classification Search
CPC ... B29C 64/343; B29C 64/336; B29C 64/277; B29C 64/165; B29C 64/112; B29C 64/10; B81C 2201/0184; B41J 3/543
See application file for complete search history.

(56) References Cited

U.S. PATENT DOCUMENTS

| | | | |
|---|---|---|---|
| 2010/0127433 A1* | 5/2010 | Medina | B29C 64/112 |
| | | | 264/401 |
| 2017/0021566 A1* | 1/2017 | Lund | B29C 64/118 |
| 2018/0354058 A1* | 12/2018 | Twelves, Jr. | B23K 9/124 |
| 2019/0039299 A1* | 2/2019 | Busbee | A43B 1/14 |
| 2019/0255765 A1* | 8/2019 | Takeyama | G03G 15/2039 |
| 2020/0290279 A1* | 9/2020 | Sanzari | B29C 64/295 |
| 2021/0060860 A1* | 3/2021 | Li | B29C 64/209 |

* cited by examiner

EXTRUSION SYSTEM FOR 3-D PRINTING OF VISCOUS ELASTOMERS

CLAIM OF PRIORITY

This Application is Non-Provisional of, and claims priority to, U.S. Provisional Patent Application No. 62/821,572, filed on Mar. 21, 2019 and titled "Extrusion System for 3-D Printing of Viscous Elastomers", which is incorporated by reference in its entirety for all purposes.

GOVERNMENT SUPPORT

This invention was made with government support under TN00014-16-1-2529 awarded by the United States Navy Office of Naval Research. The government has certain rights in the invention.

BACKGROUND

Rapid precision manufacturing of soft and flexible machine components made from elastomers have numerous barriers. Most common techniques include molding and injection molding, lamination casting (e.g., soft lithography) retractable pin casting, lost wax casting and rotomolding. These techniques involve manual handling that introduces uncontrolled variability into manufacturing tolerances and specification, ultimately introducing unreliability into the final product. In addition, each technique has its own inherent limitations on geometric shapes possible. Additive manufacturing (AM) techniques have risen to replace the aforementioned methods due to inherently higher precision and less human intervention afforded by current AM technologies.

AM techniques are variations of 3D printing, such as stereolithography (SLA), and its derivative techniques fused filament fabrication (FFF) and poly-jetting are more common in industrial production of soft high-precision specialty parts. However, these techniques are limited by materials that can be employed. Due to the high viscosity of the precursor materials, many elastomers are generally difficult to print by the print heads designed for these techniques. In cases where successful printing of elastomers is possible, the resulting products have weaknesses that may render them unusable for the tasks for which they were made to fulfill. In other instances, 3D-printed elastomeric materials made by the aforementioned techniques may be too hard, having Shore hardnesses that are too high in comparison to molded materials such as molded polydimethylsiloxane (PDMS), and therefore unsuitable.

Final material hardness and strain limits are a function of the precursor ink materials that are accessible to the technique. As a means of comparison across technologies, the de facto standard may be molding PDMS, having Shore hardnesses under 10 A, while mainlining high strain limits in excess of 600%. These characteristics are ideal for soft parts needed for flexible machine parts having complex geometries, including robotic flexors, and the new area of hydraulically- or pneumatically-actuated soft robots, having no external or internal hard "skeleton" framework or scaffolding for mechanical support.

The ability to 3D-print PDMS directly has remained a challenge. In recent years, extrusion systems capable of printing viscoelastic liquids such as PDMS precursor preparations have been developed to date with limited success, some employing direct ink writing (DIW). Commercial DIW systems are also available, but these devices lack the ability to print internal structures or to use two-part platinum cured PDMS materials that require thermal activation. A demand remains for developing DIW extruder heads that are capable of highly controlled and rapid 3D printing of viscous elastomers such as PDMS into complex geometries with internal voids and viscoelastic fluids, including parts having hardness gradients.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

Figure 1:
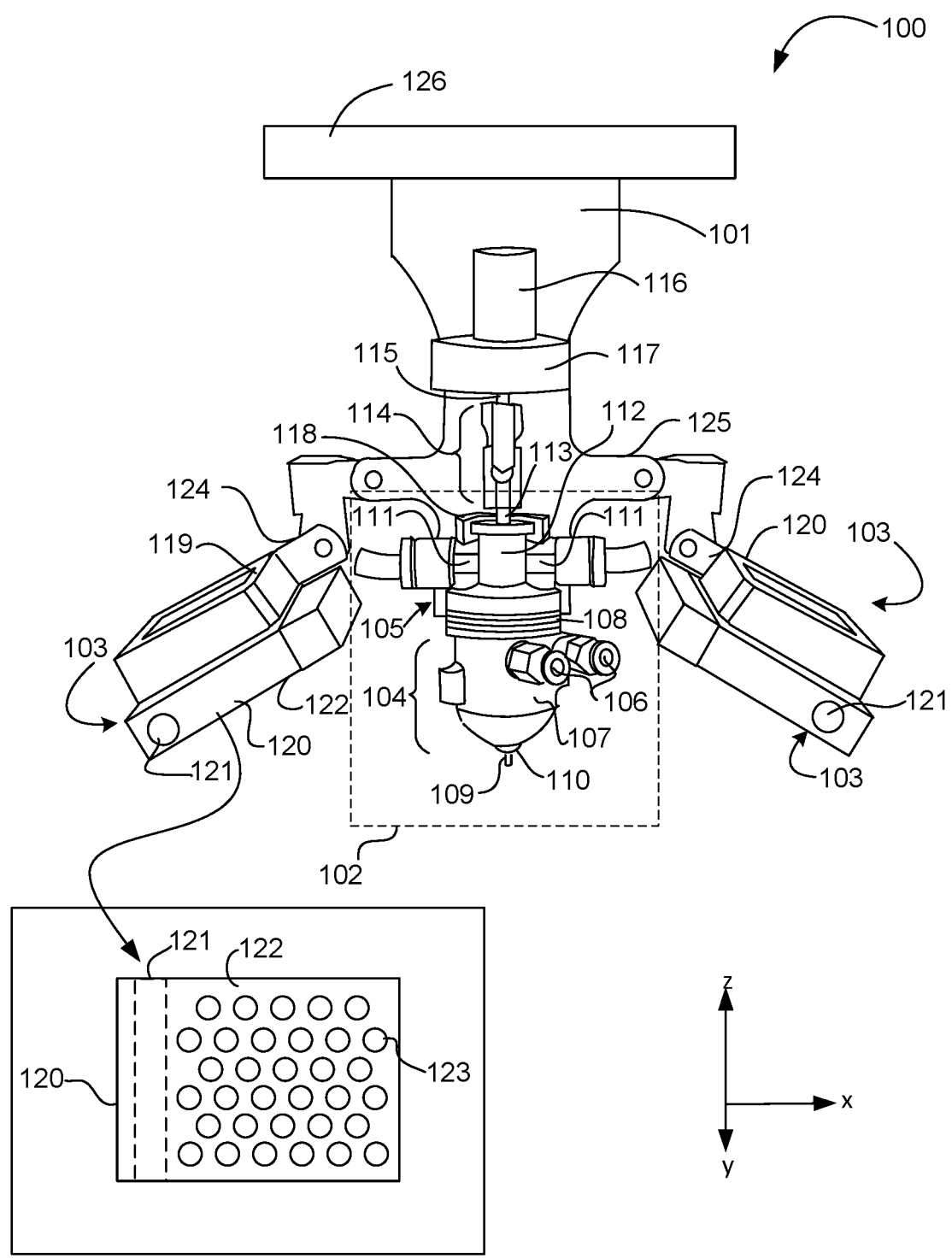

FIG. 1 illustrates an oblique view of a 3D print extrusion head for printing two-part viscoelastic liquids, comprising a mixer, a water jacket and heater wings, according to some embodiments of the disclosure.

Figure 2:
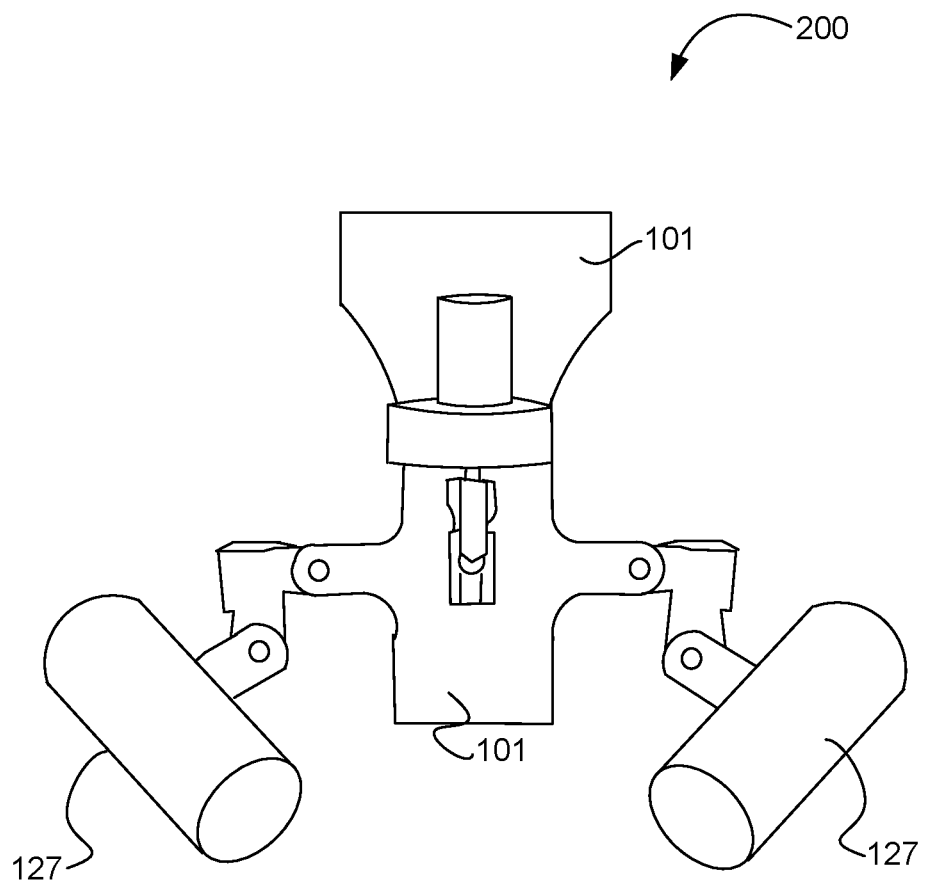
Figure 2:
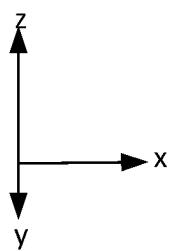

FIG. 2 illustrates an oblique view of a 3D print extrusion head showing radiative heaters, according to some embodiments of the disclosure.

Figure 3:
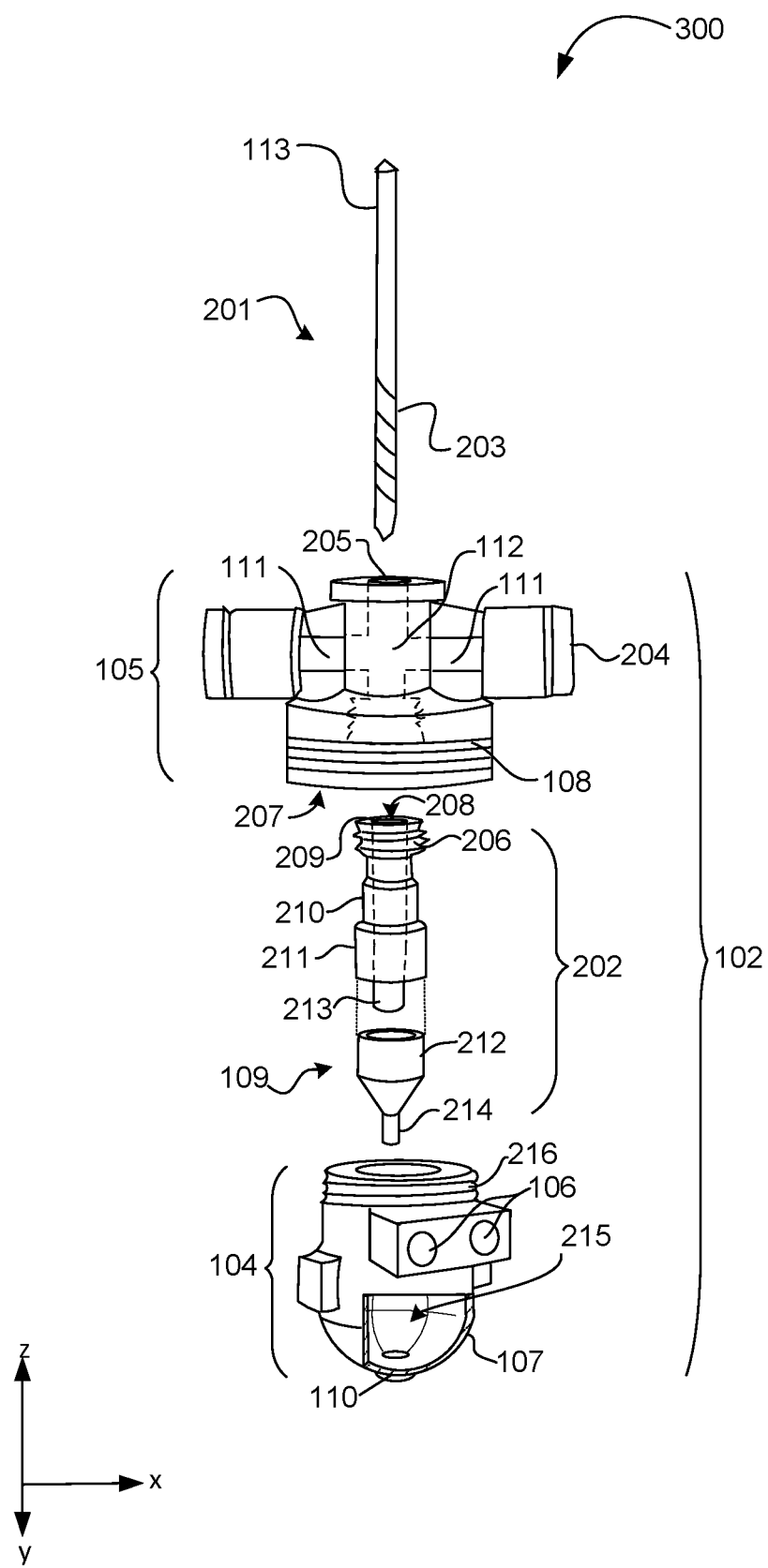

FIG. 3 illustrates an exploded view of a mixer subassembly, according to some embodiments of the disclosure.

Figure 4:
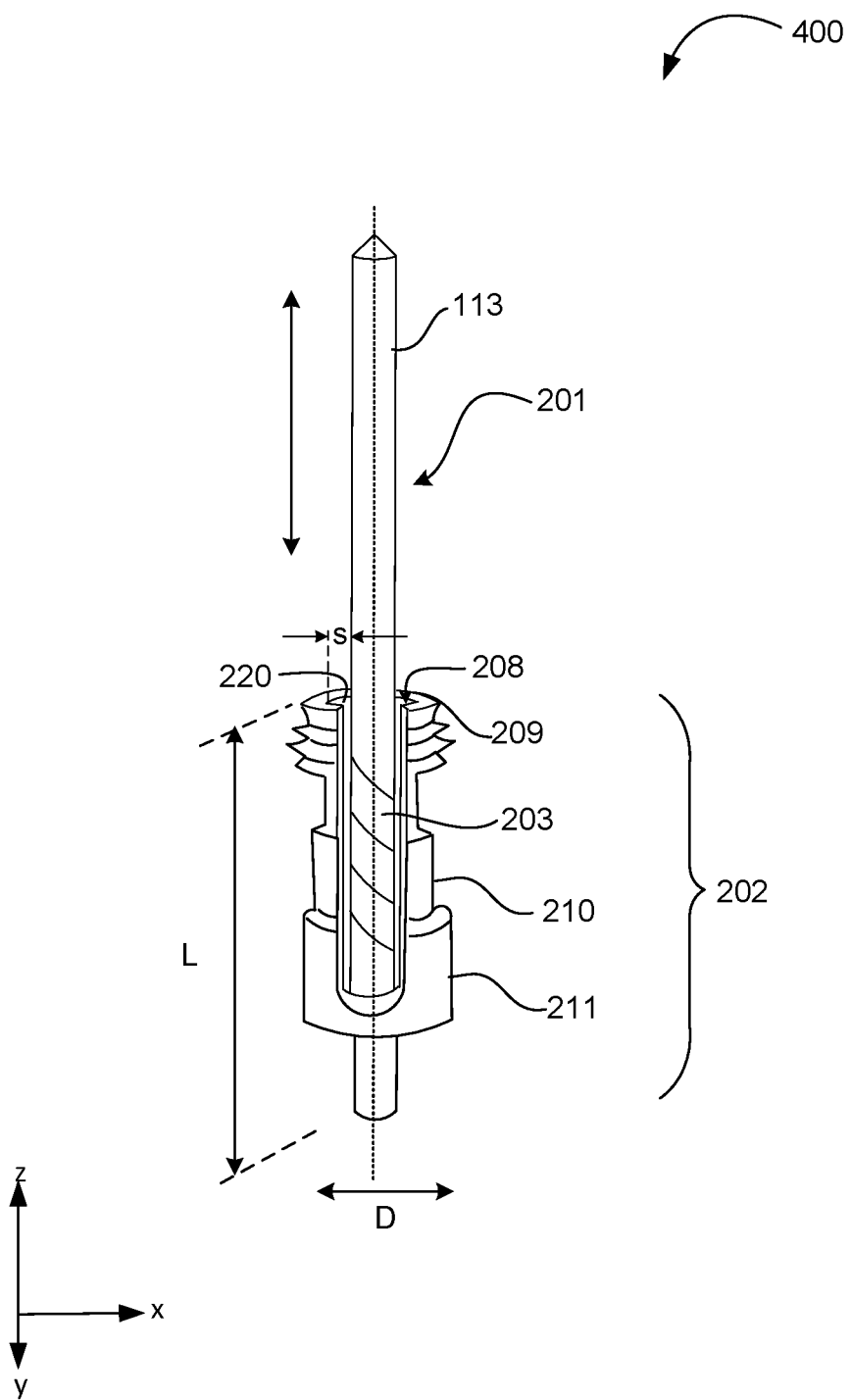

FIG. 4 illustrates an oblique cutaway view of an impeller assembled with an in-line mixing chamber, according to some embodiments of the disclosure.

Figure 5:
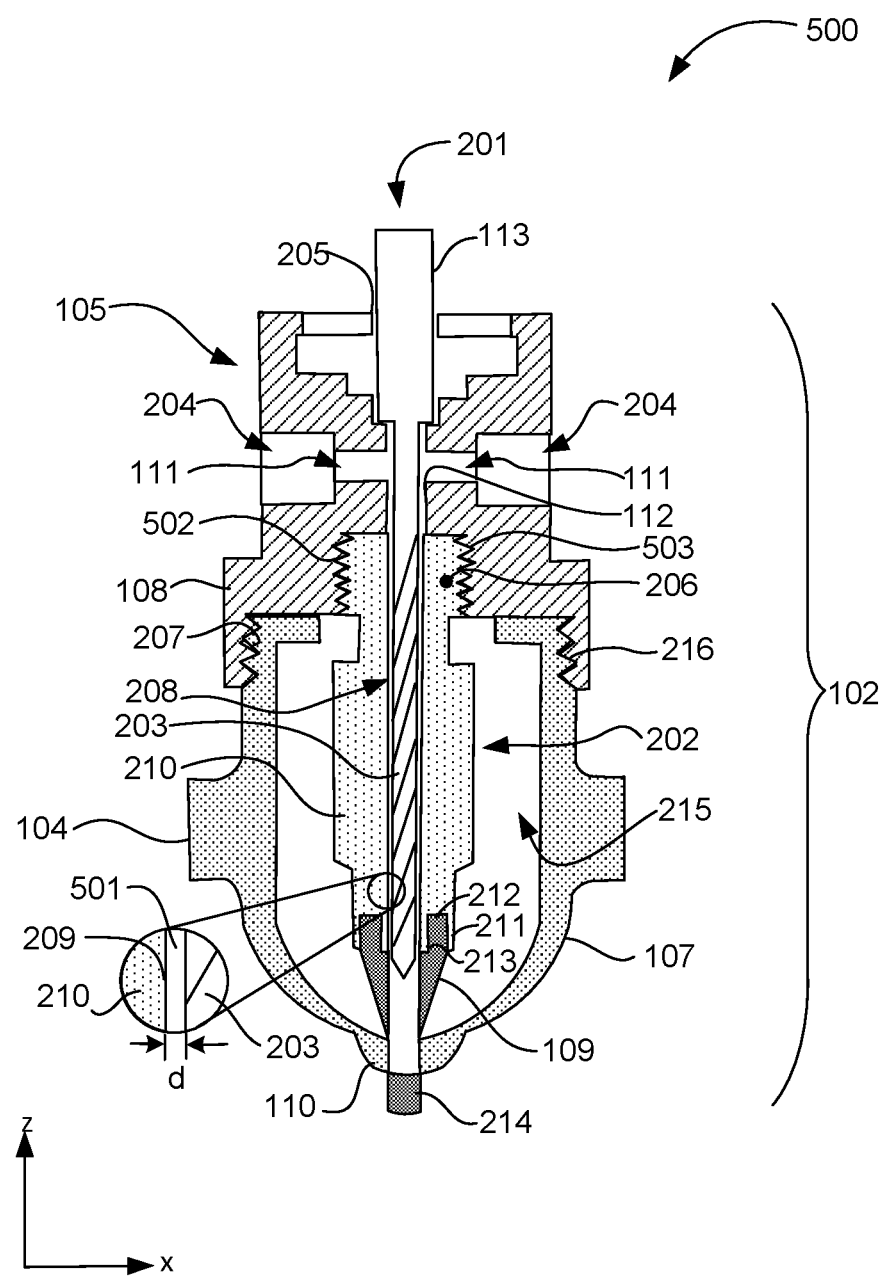

FIG. 5 illustrates an oblique cross-sectional view of an in-line mixer assembly comprising an in-line mixer and an impeller, according to some embodiments of the disclosure.

Figure 6:
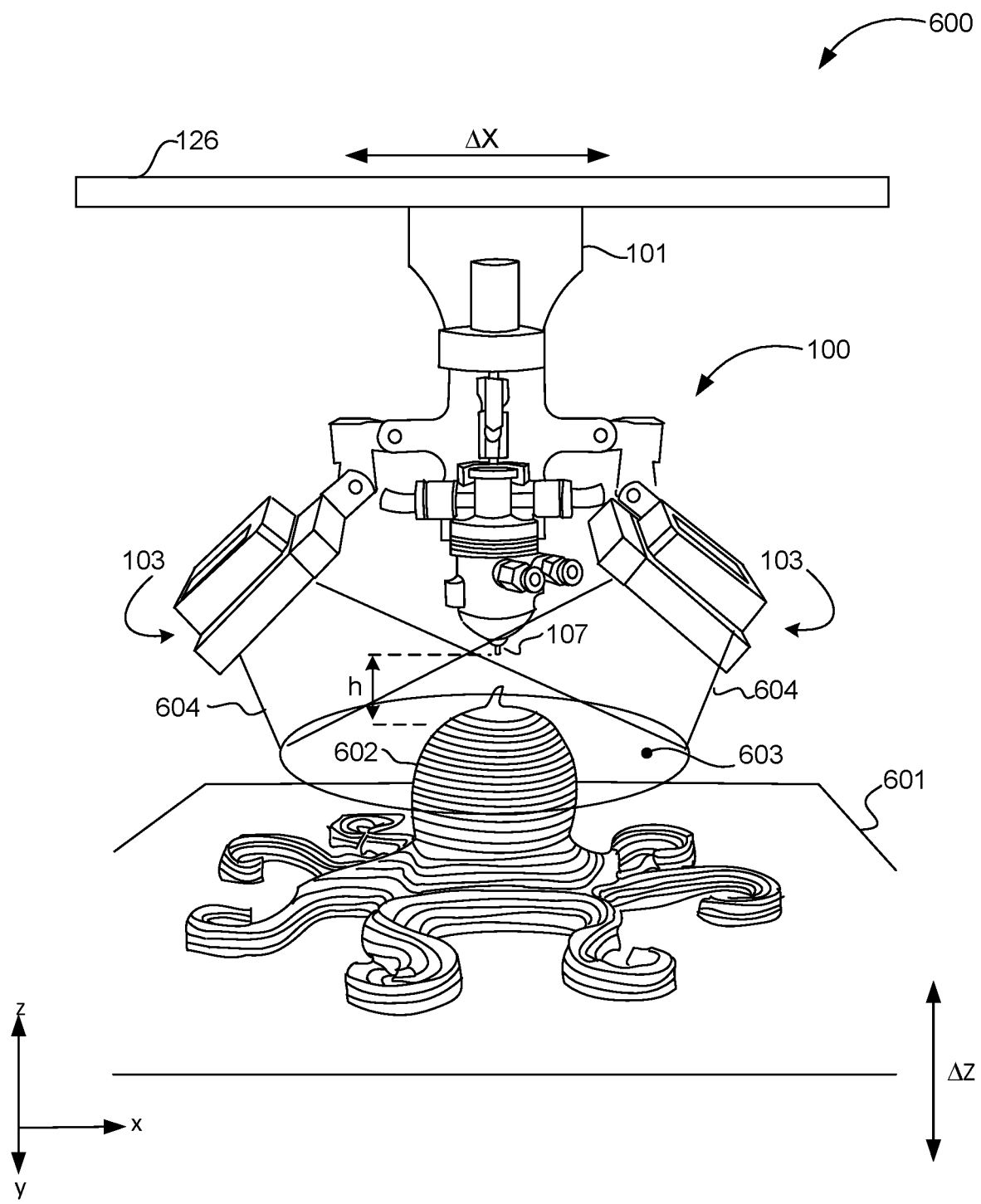

FIG. 6 illustrates an oblique view of a 3D print extrusion head mounted over a work surface in the process of 3D printing an elastomeric structure, according to some embodiments of the disclosure.

Figure 7:
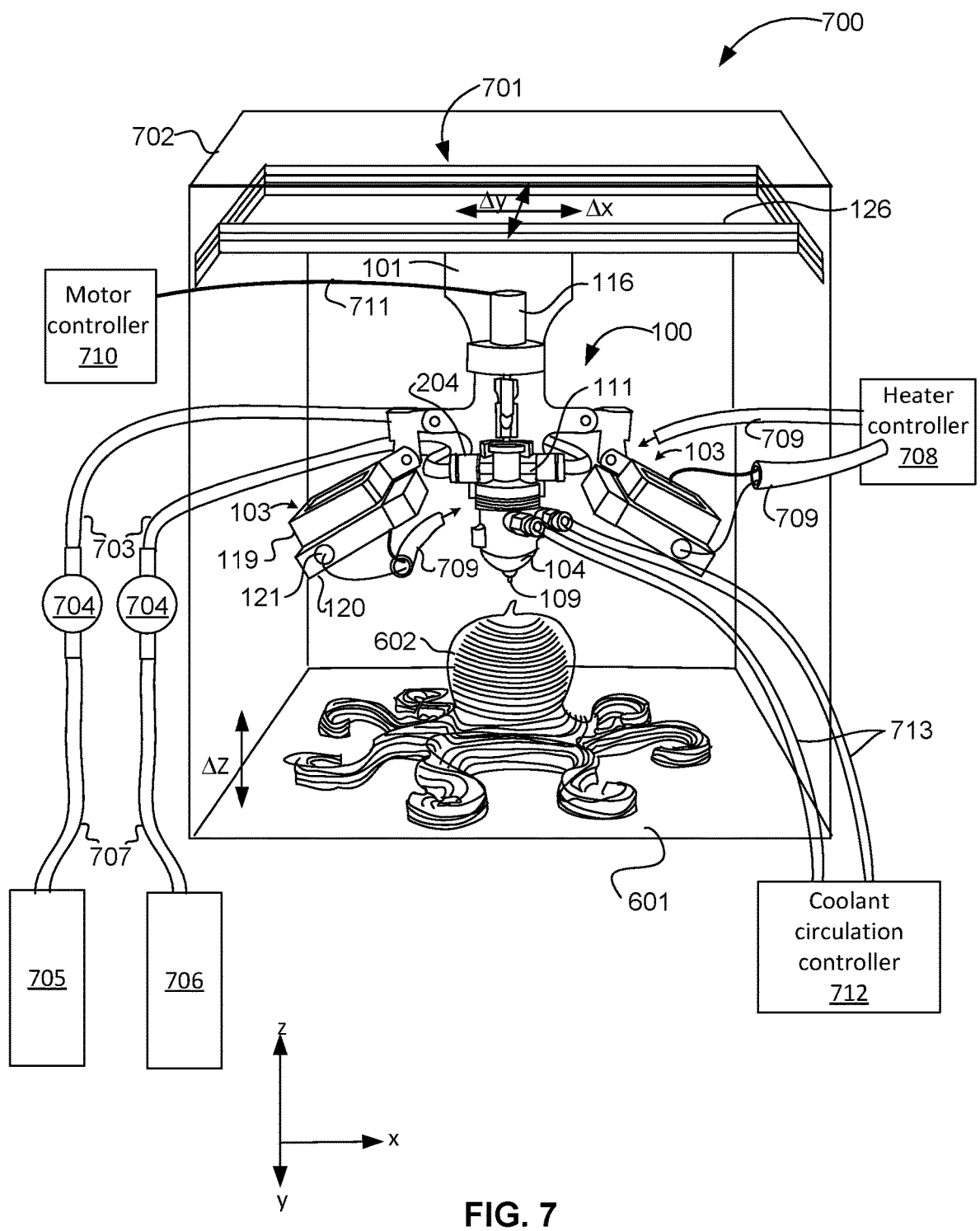

FIG. 7 illustrates a 3D elastomer printing system comprising a 3D print extrusion head, according to some embodiments of the disclosure.

Figure 8:
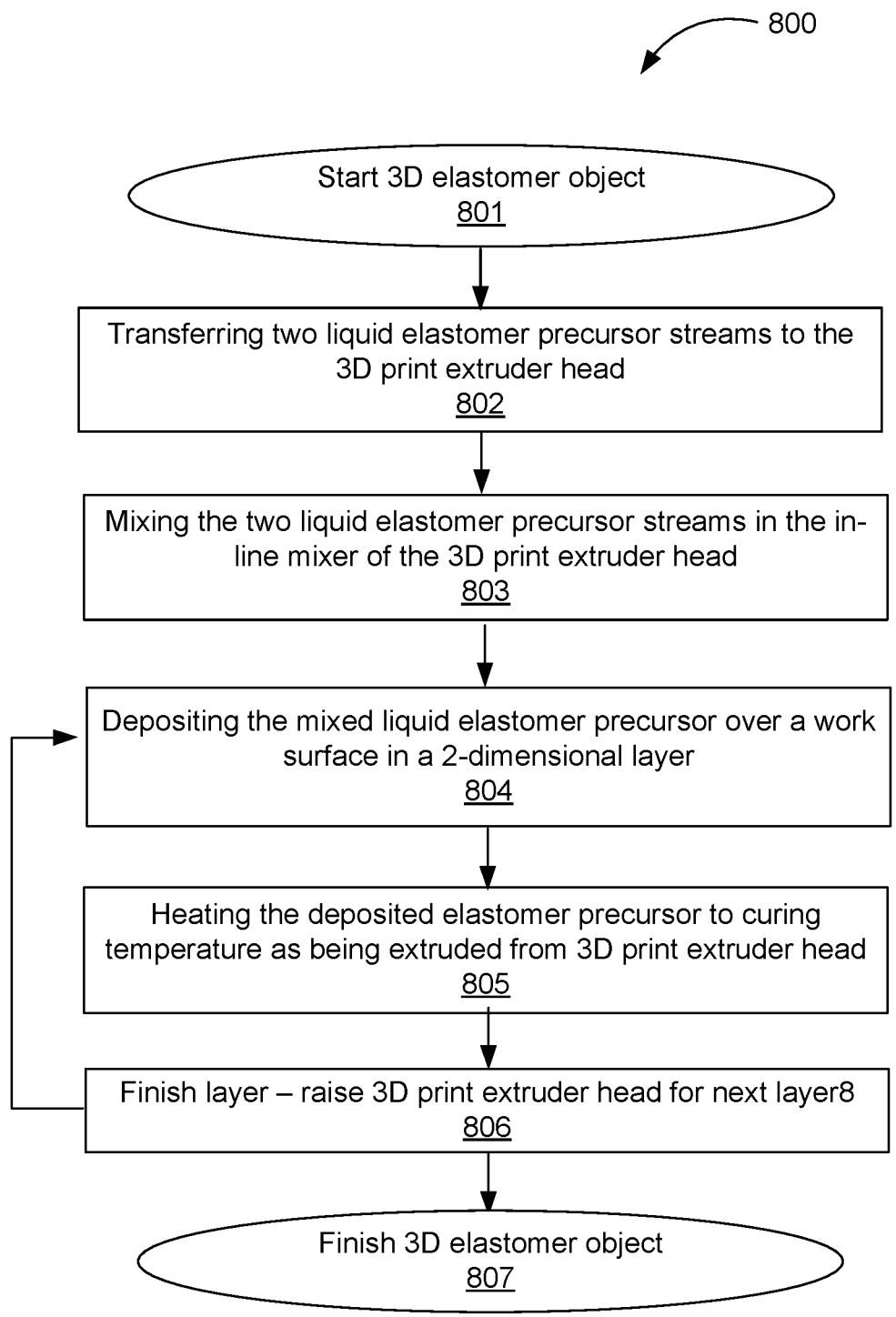

FIG. 8 illustrates a flow chart outlining an exemplary method of direct ink writing (DIW) of a 3D elastomeric object, according to some embodiments of the disclosure.

DETAILED DESCRIPTION

For purposes of description of the disclosed embodiments and the views shown in the figures, the vertical orientation is in the z-direction and it is understood that recitations of "top", "bottom", "above" and "below" refer to relative positions in the z-dimension with the usual meaning. However, it is understood that embodiments are not necessarily limited to the orientations or configurations illustrated in the figure.

The terms "substantially," "close," "approximately," "near," and "about," generally refer to being within +/−10% of a target value (unless specifically specified). Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

Views labeled "cross-sectional", "profile", "plan", and "oblique" correspond to orthogonal planes within a Cartesian coordinate system. Thus, cross-sectional and profile views are taken in the x-z plane, plan views are taken in the x-y plane, and isometric views are taken in a 3-dimensional Cartesian coordinate system (x-y-z). Where appropriate, drawings are labeled with axes to indicate the orientation of the figure.

A 3D print extruder head and 3D print system for 3D printing (direct ink writing, DIW) of elastomeric materials having highly viscous liquid precursors is disclosed. In particular, the 3D print extruder head produces silicone objects having complex geometries. The disclosed 3D print extruder head comprises an in-line mixer for mixing two or more elastomer precursor components, such as a two-component silicone system comprising a base and hardener. The in-line mixer comprises an impeller that is coupled to a motor. The disclosed 3D print extruder head further comprises heater wings adjacent to the in-line mixer to heat extruded elastomer and initiate curing, and a water jacket surrounding the in-line mixer to shield it from elevated temperatures. In some embodiments, the impeller that is retractable to start and stop flow out of the in-line mixer.

FIG. 1 illustrates an oblique view of 3D print extrusion head 100 for printing two-part viscoelastic liquids, according to some embodiments of the disclosure.

In FIG. 1, a view of the overall print extrusion head assembly is shown. 3D print extrusion head 100 comprises carrier 101, mixer subassembly 102 mounted on carrier 101, heater wings 103 mounted on carrier 101. Heater wings 103 flank mixer subassembly 102. Mixer subassembly 102 comprises cooling jacket 104 around an in-line active mixing unit (e.g., see FIGS. 3 and 4), coupled to fluid distribution cap 105 that is above cooling jacket 104.

Cooling jacket 104 comprises circulation ports 106 disposed on outer wall 107 of cooling jacket 104. Circulation ports 106 may couple to coolant circulation tubing (shown in FIG. 7 and described below). Circulation ports 106 communicate with a cavity within cooling jacket 104 (e.g., cavity 213 shown in FIG. 3). In some embodiments, cooling jacket 104 is detachable from fluid distribution cap 105. In the illustrated embodiment, fluid distribution cap 105 comprises skirt 108 that has internal or external threads for receiving cooling jacket 104. Cooling jacket 104 houses an in-line mixer unit (not shown; see mixer assembly 102 shown in FIG. 3) within an inner cavity of cooling jacket 104 (e.g. cavity 215 shown in FIG. 3). In some embodiments, cooling jacket 104 comprises a threaded portion of outer wall 107 that mates with threads on skirt 108 (e.g. threads 216 shown in FIG. 3). Nozzle 109 protrudes from outlet 110 at the bottom of cooling jacket 104. As will be described below, nozzle 109 is connected to the outlet of the mixing unit and extrudes from the homogenized viscoelastic material.

Fluid distribution cap 105 comprises mixer inlet ports 111 that open into throat 112. Mixer inlet ports 111 may couple to hoses or tubing that carry two-component viscoelastic materials to throat 112 under pressure from coupled pumps, where the two components combine within throat 112 to feed into the in-line active mixing unit for homogenization.

Mixer spindle 113 extends from throat 112 to motor shaft coupler 114 above fluid distribution cap 105. Motor shaft coupler 114 is coupled to motor shaft 115, extending below electric motor 116. In some embodiments, electric motor 116 is mounted on a movable carriage (not shown) to enable vertical motion (in the z-direction) of mixer spindle 113. This vertical degree of freedom enables upward (and downward) movement of mixer spindle 113, allowing partial retraction of mixer spindle 113 from throat 112. The retraction feature is described below.

In some embodiments, electric motor 116 is mounted on carrier 101. In the illustrated embodiment, electric motor 116 is secured on ledge 117 on carrier 101. Other means of securing electric motor 116 to carrier 101 are possible. As shown in the illustrated embodiment, fluid distribution cap 105 is secured to carrier 101 by collar 118.

One or more heater wings 103 flank mixer subassembly 102. In the illustrated embodiment, heater wings 103 are convective heaters, comprising blower 119 and heating block 120. In some embodiments, heating block 120 comprises a heating cartridge 121. In some embodiments, heat cartridge 121 is embedded in heating block 120 near one side, as shown in the figure. When operated, air is blown through hole array 123 in the central portion of heating block 120, which is viewed from bottom side 122 of heating block 120 as is shown in the inset.

Hole array 123 extends through the thickness of heating block 120. Ambient air moved by blower 119 may be directed through hole array 123, and warmed as it passes through the holes. As an example, heating block 120 has a thickness of 10 mm, which may be sufficient to raise the temperature of air moving through hole array 123 from ambient to approximately 80° C. It will be understood that the example is not meant to be construed as limiting. Any suitable thickness may be selected for heating block 120. It will also be understood that the hexagonal configuration of holes in hole array 123 as shown in FIG. 1 is exemplary, and meant to be construed as limiting. Any suitable configuration of hole array 123 may be possible. Ambient air may be warmed to temperatures exceeding 80° C. by heating block 120.

Blowers 119 may comprise a rotary fan, which is operable by applying a low DC voltage (e.g., 5-24V). An external control circuit may supply power to blowers 119. Other suitable convective heating systems may be possible. As an example, heater wings 103 may comprise a heat gun geometry, which may be substituted for the blower/heating block, where filaments are employed to generate heat. In some embodiments, heater wings 103 comprise radiative heating elements, having infrared (IR) light sources such as an incandescent bulb or an array of IR light-emitting diodes (LEDs). A reflective surface may be included behind the IR light sources to focus and concentrate the heat within a restricted region on a work surface (described below).

In some embodiments, heater wings 103 are coupled to carrier 101 by articulating arms 124 attached to yokes 125 that extend laterally from carrier 101, enabling a pivoting of heater wings 103 with respect to the vertical (e.g., z-) or horizontal (e.g., x-) axes. In some embodiments, an extra degree of freedom is enabled by a second pivot axis (not shown) for pivoting heater wings with respect to the y-axis. In the illustrated embodiment, heater wings 103 are shown to be tilted at an angle with respect to the vertical axis. The tilt angle may be optimized to direct warmed air or radiated heat at a region below nozzle 109. The region may be on a work surface a distance below nozzle 109, where a work surface is disposed to receive a stream of viscoelastic liquid material flowing from nozzle 109. Heat generated from heater wings 103 may initiate curing of the deposited viscoelastic material.

In some embodiments, carrier 101, and 3D print extrusion head 100 as a whole, are suspended (e.g., above a work surface 601; see FIG. 6) from support beam 126, which may be a horizontal member of an enclosure frame, or a cantilevered stationary support stand. In some embodiments, support beam 126 is part of a gantry system that may be operated to shuttle carrier 101 along the span (e.g., along the x-axis) of support beam 126. In some embodiments, support beam 126 may be capable of being raised and lowered to raise and lower the z-height of 3D print head 100 with respect to a work surface (e.g., work surface 601, see FIG. 6).

FIG. 2 illustrates an oblique view of a 3D print extrusion head assembly 200 showing radiative heaters 126, according to some embodiments of the disclosure.

In FIG. 2, only carrier 101 is shown (e.g., carrier 101 is stripped of mixer subassembly 102) with radiative heaters 127 attached for clarity. In some embodiments, radiative heaters 127 comprise infrared sources such as IR light-emitting diodes (LEDs; not shown). In some embodiments, radiative heaters 127 comprise incandescent heat bulbs. In some embodiments, radiative heaters 127 comprise a reflective element to focus the radiated heat on a focal point a distance below the level of nozzle 109 in FIG. 1.

FIG. 3 illustrates an exploded view 300 of mixer subassembly 102 according to some embodiments of the disclosure.

Mixer subassembly 102 is a multi-part modular assembly that comprises impeller 201, fluid distribution cap 105, in-line mixer 202 and cooling jacket 104. In some embodiments, components of mixer subassembly 102 comprise rigid polymeric materials, such as thermoplastic materials including, but not limited to, polyethylene, polypropylene, polyvinyl chloride, polystyrene, polybenzimidazole, acrylics, polyamides such as nylon and fluorocarbons such as perfluoroethylene (e.g., Teflon) and acrylonitrile butadiene styrene (ABS) resins. In some embodiments, components of mixer subassembly 102 comprise thermoset plastics including, but not limited to, polyester resins such as polyethylene terephthalate (PET), polyurethanes, polyimides, bismaleaimides, furan resins, thiolyte resins, vinyl esters, bakelite resins, epoxy resins and benzoxazine resins.

Impeller 201 may also comprise a metal material, such as, but not limited to, steel alloys such as stainless steel, aluminum alloys, tungsten and copper. Impeller 201 comprises vanes 203 generally disposed below spindle 113. In some embodiments, vanes 203 spiral around spindle 113, as shown in FIG. 3. In some embodiments, vanes 203 extend laterally as flat wings from spindle 113. Impeller 201 may have a compact form factor to fit into a small volume chamber of in-line mixer 202.

Fluid distribution cap 105 comprises inlets 111 that extend inwardly through ports 204, merging with throat 112, indicated by the hidden lines. Throat 112 extends downward from mouth 205 to an internal threaded receiving portion (indicated by the hidden lines) to receive threaded stem 206 at the top of in-line mixer 202, enabling attachment and removal of in-line mixer 202 from fluid distribution cap 105. This feature enables dismantling of in-line mixer 202 for cleaning. Skirt 108 surrounds the internal threaded receiving portion. Skirt 108 comprises internal threads 207 to receive threads 216 of cooling jacket 104.

Inline mixer 202 comprises stem 206, which has male threads that mate with internal threads of fluid distribution cap 105. Inline mixer 202 may be fastened to fluid distribution cap 105 by threaded sections, where the internal chamber 208 of in-line mixer 202, delineated by the hidden lines and extending vertically from orifice 209 at the top of stem 206, is aligned with throat 112. When assembled, mixer impeller 201 penetrates downward through mouth 205 through throat 112, extending through orifice 209, such that vanes 203 are within internal chamber 208 of in-line mixer 202.

In some embodiments, body 210 of in-line mixer 202 comprises a twist interlock portion 211 for attachment of nozzle 109. Nozzle 109 may be attached to body 210 of in-line mixer 202 by mating portion 212 of nozzle 109 that fits over outlet 213 in the twist interlock portion 211 of active in-line mixer 202.

Inline mixer 202 may insert into cavity 215 so that tip 214 of nozzle 109 protrudes through bottom orifice 110 of cooling jacket 104. Ports 106 open into cavity 215. External tubing (not shown; see FIG. 7) may be coupled to ports 106, enabling circulation of a suitable coolant, such as water, but not limited to, mixtures of water and alcohol and mixtures of water and glycol, by an external pumping system coupled to ports 106. Cooling jacket 104 may be fastened to fluid distribution cap 105 by mating threads 216 at the top of cooling jacket 104 with internal threads 207 on the interior of skirt 108 of fluid distribution cap 105.

Cooling jacket 104 may be employed to protect in-line mixer 202 from heat that may be indirectly sensed from the adjacent heaters (e.g., heater wings 103). The coolant circulating in cavity 215 may bathe in-line mixer 202 with a constant temperature fluid. During operation, the local environment may reach temperatures of 60° C. to 80° C. In the absence of cooling jacket 104, body 210 of in-line mixer 202 may heat to elastomer curing temperatures. This may cause mixed liquid elastomer components within mixer chamber 208 to prematurely cure within the boundary layer at the walls. The velocity of the visco-elastic precursor mixture material may be essentially zero close to the internal wall of mixer chamber 208, enabling thermally activated curing beginning at the wall, and moving into the interior of in-line mixer 202. The growth of cured elastomer inward toward the center of in-line mixer 202 may result in clogging, requiring frequent cleaning and impact the printing process.

FIG. 4 illustrates a cutaway view 400 of in-line mixer 202, showing impeller 201 seated within internal chamber 208 of in-line mixer 202, according to some embodiments of the disclosure.

In some embodiments, in-line mixer 202 is substantially cylindrically symmetric, and has a length L that is greater than diameter D. In the illustrated embodiment, diameter D is the diameter of twist interlock portion 211, which the maximum diameter of in-line mixer 202. Internal chamber 208 is an interior cavity that is elongated along a central axis of in-line mixer 202 and surrounded by mixer body 210.

Impeller 201 extends through orifice 209, along the central axis (indicated by the dotted vertical line in the figure), into internal chamber 208. Vanes 203 of impeller 201 may be within internal chamber 208.

In some embodiments, impeller 201 is retractable within internal chamber 208, as indicated by the vertical double arrows adjacent to impeller 201. Spindle 113 is coupled to the motor (e.g., electric motor 116), which may be translatable in the z-direction on carrier 101. Actuation of the vertical motion may move impeller 201 up and down within internal chamber 208 for blocking and unblocking outlet tip 214.

In some embodiments, a gap is between the outward edges of vanes 203 and chamber wall 220. In some embodiments, the gap has a width s that is less than 500 microns. In some embodiments, the gap has a width s that is less than 200 microns.

FIG. 5 illustrates a cross-sectional view 500 of mixer subassembly 102 as assembled, according to some embodiments of the disclosure.

In some embodiments, mixer subassembly 102 comprises fluid distribution cap 105 having integrated inlet ports 204. Inlet ports 111 open into throat 112, extending between tubing connectors 204 and throat 112. Impeller 201 comprises spindle 113, and vanes 203. Spindle 113 may couple to a motor shaft (e.g., motor shaft coupling 112).

Spindle 113 of impeller 201 extends through mouth 205, where a seal (e.g., an o-ring) may form a seal at mouth 205 to prevent leakage of viscoelastic material from leaking out of mouth 205 when the device is operated. Vanes 203 of impeller 201 extend downward (z-direction) through throat 112 of fluid distribution cap 105, and is seated within active in-line mixer 202. Vanes 203 are housed within internal chamber 208.

The inset shows a magnified view of gap 501 between vanes 203 and modular body 210. In some embodiments, vanes 203 are separated from in-line chamber wall 220 by a distance d. In some embodiments, distance d is 200 microns or less. Distance d may be limited to sub-millimeter values to limit the boundary layer thickness of viscoelastic materials that are stirred within internal chamber 208 while flowing through in-line mixer 202 during the mixing process. A dead layer of elastomer may form in a zero-velocity zone where precursor may cure and eventually clog the mixer. Limitation of the boundary layer thickness to 200 microns or less during mixing substantially reduces chances of clogging of internal chamber 208.

In the illustrated embodiment, stem 206 comprises external threads 502 that mate with mixer receiving threads 503 of fluid distribution cap 105. Inline mixer 202 is fastened to fluid distribution cap by mated threads on stem 206, which may be substantially fluid-tight to prevent visco-elastic materials from leaking out of in-line mixer 202 when the device is operated. Alternatively, in-line mixer 202 may be clamped to fluid distribution cap 105. Inline mixer 202 is housed within cavity 215 of cooling jacket 104, which is also fastened to fluid distribution cap 105 by mating external threads 216 on wall 107 of cooling jacket 104 with internal threads 207 on the inner side of skirt 108. The mated threads may form a fluid-tight junction, preventing cooling fluids from leaking from cavity 215.

The outlet of in-line mixer 202 feeds into nozzle 109, which is attached to mixer body 210 by insertion of mating portion 212 on nozzle 109 into twist interlock portion 211. The conical section of nozzle 109 seats at the bottom of cavity 215, forming a seal. Nozzle tip 214 extends through orifice 110 to the exterior. When the device is operated, nozzle tip 214 extrudes mixed visco-elastic materials exiting in-line mixer 202 to the exterior.

In some embodiments, impeller 201 is translatable in the z-dimension within in-line mixer 202, (e.g., as indicated by the vertical double arrow in FIG. 4). The vertical motion of impeller 201 may be actuated by a mechanism (not shown) moving the motor (e.g., electric motor 116) upward and downward, or by an internal shaft retraction feature of the motor. The actuation of the vertical motion of impeller 201 may be advantageous for rapid starting and stopping extrusion of an elastomer precursor mixture (see below).

FIG. 6 illustrates an oblique view 600 of 3D print extrusion head 100 mounted over work surface 601 in the process of 3D printing elastomeric structure 602, according to some embodiments of the disclosure.

FIG. 6 shows 3D print extrusion head 100 in the process of printing 3D elastomeric structure 602. For clarity, 3D print extrusion head 100 is shown as being detached from tubing and external auxiliary equipment. Heater wings 103 may be activated to apply convective heating to a region of space over a layer of elastomeric structure 602, indicated by plane 603. In some embodiments, elastomeric structure 401 may comprise PDMS. In the illustrated embodiment, airstreams 604 blown by heater wings 103 may be directed to overlap in a space containing plane 603, at a distance h below nozzle 109. During operation, liquid elastomer precursor that is premixed by the in-line mixer (e.g., in-line mixer 202) is extruded through nozzle 109 onto work surface 601. Work surface 601 may be heated to facilitate curing of extruded material. As an example, work surface 601 may be heated internally to 45° C.-55° C.

During operation, plane 402 may substantially coincide with work surface 601. Heat emanating from heater wings 103 is directed to work surface 601 that may be located at a distance h below nozzle 109. Heat may be in the form of a hot convective airstream 604 as shown in the illustrated embodiment, or as radiative heat emanating from radiative heaters (e.g., radiative heaters 127 in FIG. 2). The heat may be regulated to rapidly raise the temperature of freshly extruded precursor material to a pre-determined curing temperature. As an example, heating cartridges 121 of heater wings 103, may be powered to heat heater block 120 to 85° C.-90° C.

Beam 126 may be part of a gantry system (shown in FIG. 7). Carrier 101 is translated by a conveyer mechanism that may be supported on beam 126, shuttling 3D extrusion print head 100 laterally in the x- and y-directions, including oblique directions, relative to work surface 601. The lateral motion is indicated by the double arrows extending in the x-direction in the figure. In some embodiments, beam 126 may be moved in vertical directions (e.g., z-direction). In some embodiments, work surface 601 may be raised and lowered vertically in the z-direction with no lateral motion, enabling a layer-by-layer build-up process to form elastomeric structure 602.

As an operational example, 3D print extrusion head 100 may extrude a layer of PDMS having a thickness of 0.8 mm from nozzle 109 having an internal diameter of 0.839 mm A filament of PDMS precursor material may be extruded from nozzle 109 having a width that may be nominally the nozzle diameter, but may vary depending on translation speed and distance between nozzle tip (e.g., tip 214) and work surface 601. An exemplary translation speed in a single direction of 3D print extrusion head 100 may be as high as 50 mm/sec. A two-dimensional pattern may comprise rectilinear motion (e.g., motion in the x- and y-directions) and oblique directions that are combinations of x- and y-coordinates. Overall print motion, taking into account oblique directions, may have an average print speed of 10 mm/s. An exemplary extrusion rate of the PDMS precursor material to form a filament may be approximately 25 ml/hr.

To create a three-dimensional object, such as elastomeric structure 602, 3D print extrusion head 100 is translated in rectilinear directions (e.g., x- and y-directions) and oblique directions (combinations of x- and y-coordinates) to create a two-dimensional layer of the elastomer (e.g., PDMS). The temperature of the hot convective airstreams may be adjusted (e.g., airstream at 85° C.) to rapidly heat the freshly extruded material to a suitable curing temperature (e.g. to 50° C.). Similarly, for a radiative heat source such as radiative heaters 127 in FIG. 2, the power level may be adjusted to heat the freshly extruded material to a target curing temperature. This may be maintained by heated work surface 601.

As 3D print extrusion head 100 translates, the freshly extruded material continues to heat within the overlap region of the two convective airstreams impinging on plane 603. The heat may be retained in the material after passage of the heater wings 103, allowing the material to continue curing. The catalyst type and concentration in the hardening component of the precursor material (e.g., for a platinum catalyst) may be adjusted for a curing speed that renders the extruded material hard enough to support the weight of additional layers that are printed overhead within the time of printing of the current layer. A desired hardness may be produced by a combination of curing temperature and catalyst.

Work surface 601 may also be heated to prevent cooling of the curing material. Heat emanating from work surface 601 may penetrate to the top layers of an increasing stack of layers to sustain the curing temperature of the higher layers. In some embodiments, the printing process is carried out in an enclosure to maintain an elevated ambient temperature.

Once the current layer is completed, raised by an increment Δz, that may be determined in part by the thickness of the extruded bead (e.g., Δz=0.8 mm). With these printing parameters, the time to create the 3D-printed object having dimensions of 120 mm×120 mm×70 mm may take up to 18 hours. For the same structure 401, as an example, shorter 3D print times of 12 hours may be obtained by increasing nozzle diameter (e.g., to 1.3 mm). Hardness (e.g., Shore hardness) may be controlled by the elastomer formulation. As an example, various PDMS grades may produce elastomer having a Shore hardness of 10 A or less, suitable for production of soft robot parts. Cure speed of the elastomer is also dependent on the particular chemical formulation and catalyst concentration.

FIG. 7 illustrates 3D elastomer printing system 700 comprising 3D print extrusion head 100, according to some embodiments of the disclosure.

3D elastomer printing system 700 comprises 3D print extrusion head 100 supported on carrier 101 suspended on beam 126. Beam 126 is part of gantry system 701, which is housed inside enclosure 702, as shown in the illustrated embodiment. As indicated by the double arrows, gantry system 701 may translate 3D print extrusion head 100 in lateral directions, including rectilinear and oblique directions, over work surface 400. In some embodiments, gantry system 701 is movable in the vertical (z) direction. Nozzle 109 may extrude elastomer precursor (e.g., uncured PDMS) from the active mixer (e.g., in-line mixer 202) within cooling jacket 104. Gantry system 701 may be driven by stepper motors that are commanded by a controller interfaced to a computer. Motion may be commanded by software (e.g., G-code) that encodes the three-dimensional coordinates corresponding to the printed structure 602. As an example, rectilinear and crossing motion patterns may be programmed into the G-code to command rectilinear and criss-cross motion of work surface 601 for desirable print results.

As shown in the illustrated embodiment, a two-component elastomer precursor is fed to fluid distribution cap 105 through conduits 703 that are coupled to inlet ports 111 through tubing connectors 204. Conduits 703 may be vinyl tubing. Conduits 703 may be each coupled to one of pumps 704. Pumps 704 may be any of a pair of syringe pumps, peristaltic pumps or membrane pumps. Pumps 704 are coupled to reservoirs 705 and 706 through conduits 707. Reservoirs 705 and 706 may be syringe barrels if pumps 704 are syringe pumps. Each of reservoirs 705 and 706 may contain one of the elastomer precursor components. As an example, reservoir 705 may contain a PDMS precursor component A, and reservoir 706 may contain a hardener component B.

Pumps 704 may deliver precursor liquids to the mixer at a constant or variable rate, depending on print requirements. The mixing ratio of the two components may be determined by the individual flow rates of the two pumps 704. As an example, flow rates are equal for a 1:1 mixture. Pumps 704 are capable of developing pressures sufficient to pump the visco-elastic precursor liquids at the desired flow rates through the flow restrictions presented by the space between the chamber wall (e.g., chamber wall 220) of in-line mixer (e.g., in-line mixer 202) and the impeller vanes (e.g., vanes 203, and the internal diameter of nozzle 109.

Heater wings 103 may be powered by heater controller 708. Heat cartridges 120 are shown coupled to heater controller 508 by heater cables 509. Heater controller 708 may control both power to blowers 119 and power to heat cartridges 121. Heater controller 708 may be coupled to a computer (not shown) or have a user interface for manual programming A temperature sensor may be coupled to heater controller 708 for automatic temperature control of the hot airstreams (e.g., airstreams 604, FIG. 6). The temperature sensor may be a thermocouple attached to heating blocks 120.

Coolant circulation controller 712 pumps coolant through coolant conduits 713 to ports 106 for circulation of coolant within cooling jacket 104. Coolant circulation controller 712 may have a heat dissipation section comprising a refrigeration unit for heat removal from returning coolant. The temperature of the coolant may be regulated to circulate chilled coolant through cooling jacket 104.

Motor controller 710 may be coupled to motor 116 through motor cable 711. Motor 116 may be a dc motor, an ac motor, a universal motor, or a stepper motor. The controller circuitry in motor controller 710 is suited to the type of motor 116. As an example, motor 116 is a dc motor running on 0-12 VDC, supplied by motor controller 710. Motor 116 may produce sufficient torque to turn the impeller (e.g., impeller 201) within the mixer (e.g., in-line mixer 202) at a given motor speed. Motor controller 710 is operated to supply sufficient power to motor 116 to run at desired speeds.

In some embodiments, work surface 601 is optionally heated, and may be heated by internal electric heating elements or by a circulating fluid. A separate heat controller (not shown) may be employed to control the temperature of work surface 601. As an example, work surface 601 may be maintained at a temperature of 50° C. Work surface 601 may be on a z-motion table for motion relative to nozzle 109. A computer-commanded motion controller (not shown) may be coupled to the actuators (e.g., stepper motors or linear drivers) of z table that is programmed to direct motion. G-code may be employed for commanding the motion controller.

FIG. 8 illustrates a flow chart 800 outlining an exemplary method of direct ink writing (DIW) of a 3D elastomeric object, according to some embodiments of the disclosure.

At operation 801, a 3D elastomer printing system (e.g., elastomer printing system 500) is prepared for DIW (e.g., 3D printing) of a three-dimensional elastomeric object. In the illustrated embodiment, a two-component silicone elastomer (e.g., PDMS) is employed as the exemplary elastomer. Other suitable elastomers may be equally employed for illustration of the exemplary method. The two component silicone system may comprise a base precursor and a hardener component. The hardener component may contain a cross-link catalyst comprising platinum. Other catalysts are possible. Both components are liquids that may exhibit visco-elastic flow characteristics, presenting a high viscosity to the fluid transfer system comprising pumps and tubing (e.g., pumps 704 and conduits 703 and 707). The precursor components may each be contained in a separate reservoir container (e.g., reservoirs 705 and 706). In some embodiments, a thinner is added to the precursor components to reduce the viscosity. Pumps and tubing lines may be primed with the precursor components.

The 3D print extrusion head (e.g., 3D print extrusion head 100) may be cleaned from a previous print operation. As an example, the mixer subassembly (e.g., mixer subassembly 102) may be disassembled and cleaned to remove residual liquid precursor and removal of any cured elastomer from the in-line mixer (e.g., in-line mixer 202), impeller (e.g., impeller 201), and nozzle (e.g., nozzle 109).

At operation 802, the process is set into motion. Pumps (e.g., pumps 704) may be started to move the precursor components from the containment reservoirs into the in-line mixer (e.g., in-line mixer 202) carried on the 3D print extrusion head. The impeller (e.g., impeller 201) is coupled to an on-board motor (e.g., motor 116) mounted on the chassis of the 3D print extrusion head. A motor controller (e.g., motor controller 710) is initiated to activate the on-board motor, and spin the impeller inside the in-line mixer. The two precursor components may be continuously pumped to the in-line mixer 202 at a constant rate. In some embodiments, the precursor components are pumped at a variable rate to the in-line mixer 202.

At operation 803, the two elastomer precursor components are introduced into the in-line mixer 202 through inlets (e.g., inlets 111) as continuous streams. An example of a suitable elastomer is a silicone having a two-component precursor system. A first component may be a low molecular weight (e.g., un-cross-linked) silicone precursor that exhibits visco-elastic flow characteristics. A second component may be a hardener compound that comprises a catalyst in a matrix of low molecular weight silicone precursor. The catalyst may contain a platinum compound. An example of a suitable silicone formulation is polydimethylsiloxane (PDMS).

As the liquid streams enter the in-line mixer 202, they are mixed by a rotating impeller 201, driven by the on-board motor as described above. The volume of the internal chamber (e.g. internal chamber 208) of the mixer (e.g., in-line mixer 202) may be predominately occupied by the impeller (e.g., impeller 201, see description above) such that the free volume of the mixer (e.g., in-line mixer 202) is small. The impeller speed may be adjusted accordingly to thoroughly mix the components during the retention time within the mixer cavity. The impeller may comprise multiple vanes (e.g., vanes 203 of impeller 201) for more efficient mixing at slower impeller speeds.

At operation 804, the precursor mixture exits the in-line mixer 202 as it is extruded under pressure through a nozzle (e.g., nozzle 109) over a work surface (e.g., work surface 601). The precursor mixture may be extruded as a continuous bead of visco-elastic liquid that is deposited onto the work surface. The deposition occurs as there is relative motion between the 3D print extrusion head 100 and the work surface. In some embodiments, the work surface is stationary, and the 3D print extrusion head 100 is translated on a 2- or 3-dimensional gantry system (e.g., gantry system 701), where the gantry is actuated by stepper motors or linear drive mechanisms. The drives may be controlled by a motor control circuit 510 that is commanded by G-code. The G-code contains the three dimensional pattern of the object in virtual space. As an example, the motion may be a combination of rectilinear and criss-cross paths. The travel speed of the gantry may be 50 mm/sec, with a print speed of 10 mm/sec for all paths undertaken by relative motion of the 3D print extrusion head 100.

A similar method of driving the work surface in the z-direction (e.g., vertically) may be employed, as described for the gantry system 501. As an example, the work surface may be part of a z-table. G-code may be employed to command z-table.

The filament may be extruded from a nozzle (e.g., nozzle 109) having an internal diameter of approximately 1 mm or less. As an example, a nozzle diameter of 0.4 mm may be employed. As an example, from a nozzle having a 0.4 mm internal diameter, a bead having a height of 0.8 mm may be extruded. The two-dimensional layer having a thickness of 0.8 mm may be generated by overlapping parallel beads. A minimum cure of the extruded precursor is achieved by the time the layer is complete as described below. The minimum cure may be necessary to harden the layer to withstand the weight of subsequent layers without collapsing as the three-dimensional printing object grows in height.

As described above, the impeller (e.g., impeller 201) may be retractable within the in-line mixer, where the impeller is translatable along a central axis of active in-line mixer, as shown in FIG. 4. This feature may enable rapid start and stop of the extrusion process by forcing the bottom of the impeller over the opening to the nozzle, plugging it and preventing precursor mixture from exiting the in-line mixer. The impeller may be retracted to restart extrusion. Precise control over the deposition of the precursor mixture may be obtained by the retraction feature of the impeller.

At operation 805, the precursor mixture is heated simultaneously as it is extruded by the heaters on-board the 3D print extrusion head (e.g., heater wings 103). The on-board heaters may be convective heaters or radiative heaters (e.g., radiative heaters 127, FIG. 1B). The power to the on-board heaters may be regulated to cause the freshly extruded precursor mixture to raise the temperature from room temperature to a pre-determined curing temperature (e.g., 50° C.) within a set time of several seconds.

As an example, on-board convective heaters (e.g., heater wings 103) may raise the temperature of ambient air to 80° C., which, when impinging on the freshly extruded precursor bead on the work surface, may be sufficient to raise the temperature of the precursor bead to approximately 50° C. within a time window that corresponds to the time that the bead remains exposed to the heated air stream or radiated heat beam. This time is related to the speed of relative motion between the 3D print extrusion head and the work surface (e.g. work surface 601). As an example, the relative motion may be 10 mm/sec, while the heated area (e.g., plane 402) may be 20 or 30 mm wide.

In some embodiments, the work surface is heated to continue the cure of the extruded precursor bead as precursor mixture continues to be deposited over other parts of the work surface. The work surface may be heated to 45° C.–55° C. to maintain a suitable curing temperature of the deposited precursor bead. The time to produce a full layer of the three-dimensional object may be up to 40 minutes, for example, allowing sufficient cure for the layer to harden to at least a minimal hardness to withstand the weight of subsequent layers of the growing three-dimensional object.

During the DIW operation, coolant is circulated into a water jacket (e.g., cooling jacket 104) that shields the in-line mixer 202 from the ambient heat and the heat directed from the on-board heaters.

At operation 806, a layer of elastomer is completed. The layer is cured to a minimum hardness initially, and continues to cure as heat from the heated work surface is absorbed by the layer. As an example, a layer may be deposited in 10 minutes. During this time, sufficient hardness is obtained by the deposited precursor mixture as a result of the curing conditions, transforming the precursor mixture to the elastomer. The curing stage may be early, but the elastomer may continue to cure during the entire print process. Heat from the work surface may continually be absorbed by the elastomer layer well after it is finished during the printing of subsequent layers. Additional heat input may occur by absorption from warmed ambient air when the printing operation is conducted in an enclosure (e.g., enclosure 502; see FIG. 5). The degree of cross-linking may ultimately be determined by the chemical formulation and concentration of catalyst. As an example, a maximal hardness of 10 A (Shore) may be obtained for the elastomer.

The bent arrow emanating from this operation and pointing to operation 804, indicates that the process cycles back to the pattern origin to start the next layer. After completion of the current layer, the 3D print extrusion head is raised relative to the work surface 400 and return to the origin of the pattern to start the next layer of the current layer. Again, either the 3D print extrusion head or the work surface may be moved in the vertical direction.

At operation 807, the 3D-printed elastomeric object (e.g., elastomeric structure 602) is completed. During the DIW process, each layer continues to cure as long as the object grows. Lower layers may reach maximal hardness earlier than upper layers. Once completed, the three-dimensional object may be left within the enclosure, or be placed in a low-temperature oven to finish curing of the top-most layers.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known features may or may not be shown within the presented figures, for simplicity of illustration and discussion, and so as not to obscure the disclosure. Where specific details are set forth in order to describe example embodiments of the disclosure, it should be apparent to one skilled in the art that the disclosure can be practiced without, or with variation of, these specific details. The description is thus to be regarded as illustrative instead of limiting.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:
1. A printing apparatus, comprising:
   a 3D print extrusion head assembly, comprising:
      a fluid distribution cap mechanically affixed to a carrier;
      an in-line mixer fluidically coupled to the fluid distribution cap;
      a cooling jacket mechanically affixed to the fluid distribution cap, wherein at least a portion of the in-line mixer is within a cavity within the cooling jacket; and
      a nozzle mechanically affixed to the in-line mixer, wherein the nozzle extends from the in-line mixer through a wall of the cooling jacket; and
   two or more heater wings adjacent to the in-line mixer, wherein the two or more heater wings are mechanically affixed to the carrier, wherein the two or more heater wings comprise a heating block having a first surface and a second surface separated by a thickness of the heating block, wherein a blower is mechanically attached to the first surface, and wherein the heating block comprises one or more openings that extend from the first surface to the second surface through the thickness of the heating block.

2. The printing apparatus of claim 1, wherein the fluid distribution cap comprises one or more fluid inlets that are mechanically affixed to a throat.

3. The printing apparatus of claim 2, wherein the in-line mixer comprises a chamber having an inlet at a first end coupled to the throat, and an outlet at a second end, wherein an impeller is within the chamber and extends through the inlet, and wherein the nozzle is mechanically affixed to the outlet.

4. The printing apparatus of claim 3, wherein the in-line mixer comprises a threaded portion that is mechanically affixed to the fluid distribution cap.

5. The printing apparatus of claim 3, wherein the impeller comprises a shaft mechanically affixed to a motor, and wherein the motor is mechanically affixed to the carrier.

6. The printing apparatus of claim 3, wherein the impeller comprises one or more vanes, and wherein a distance between the impeller and a wall of the chamber is less than 200 microns.

7. The printing apparatus of claim 3, wherein the impeller is coupled to a shaft that is retractable, and wherein the impeller is vertically translatable along a central axis of the in-line mixer.

8. The printing apparatus of claim 1, wherein the cooling jacket comprises a threaded portion that is mechanically affixed to the fluid distribution cap.

9. The printing apparatus of claim 1, wherein at least two ports are on an outer wall of the cooling jacket and open into the cavity of the cooling jacket.

10. The printing apparatus of claim 1, wherein the heating block is oriented at an angle that is between 0° and 90° with respect to a work surface.

11. A system, comprising:
a 3D print extrusion head assembly, comprising:
- a fluid distribution cap mechanically affixed to a carrier;
- an in-line mixer fluidically coupled to the fluid distribution cap;
- a cooling jacket mechanically affixed to the fluid distribution cap, wherein at least a portion of the in-line mixer is within a cavity within the cooling jacket;
- a nozzle mechanically affixed to the in-line mixer, wherein the nozzle extends from the in-line mixer through a wall of the cooling jacket; and
- two or more heater wings adjacent to the in-line mixer, wherein the two or more heater wings are mechanically affixed to the carrier, wherein the two or more heater wings comprise a heating block having a first surface and a second surface separated by a thickness of the heating block, wherein a blower is mechanically attached to the first surface, and wherein the heating block comprises one or more openings that extend from the first surface to the second surface through the thickness of the heating block; and
- a reservoir to contain an elastomer precursor is fluidically coupled to the fluid distribution cap.

12. The system of claim 11, wherein the carrier is mechanically affixed to a gantry system.

13. The system of claim 11, wherein a work surface is mechanically affixed to a translation table that is movable in at least one direction.

14. The system of claim 11, wherein the reservoir is a first reservoir, wherein the cooling jacket is fluidically coupled to a circulation pump, and wherein the circulation pump is fluidically coupled to a second reservoir.

* * * * *